(12) United States Patent
Heins

(10) Patent No.: US 7,428,926 B2
(45) Date of Patent: *Sep. 30, 2008

(54) WATER TREATMENT METHOD FOR HEAVY OIL PRODUCTION

(75) Inventor: William F. Heins, Redmond, WA (US)

(73) Assignee: GE Ionics, Inc., Watertown, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/149,070

(22) Filed: Jun. 8, 2005

(65) Prior Publication Data
US 2006/0032630 A1 Feb. 16, 2006

Related U.S. Application Data

(63) Continuation-in-part of application No. 10/868,745, filed on Jun. 9, 2004, now Pat. No. 7,150,320, which is a continuation-in-part of application No. 10/307,250, filed on Nov. 30, 2002, now Pat. No. 7,077,201, which is a continuation-in-part of application No. 09/566,622, filed on May 8, 2000, now Pat. No. 6,733,636.

(60) Provisional application No. 60/133,172, filed on May 7, 1999, provisional application No. 60/578,810, filed on Jun. 9, 2004.

(51) Int. Cl.
- *E21B 43/24* (2006.01)
- *E21B 43/40* (2006.01)
- *B01D 1/28* (2006.01)
- *B01D 3/42* (2006.01)
- *C02F 1/04* (2006.01)
- *C02F 9/00* (2006.01)

(52) U.S. Cl. .................. 166/266; 159/24.1; 159/45; 159/47.1; 159/901; 166/267; 166/272.3; 166/303; 210/664; 210/669; 210/747; 210/805; 210/806; 405/129.35; 588/250; 203/10; 203/26; 203/48; 203/98; 203/DIG. 16

(58) Field of Classification Search .............. 166/75.15, 166/266, 267, 272.3, 272.6, 272.7, 302, 303; 159/24.1, 45, 47.1, 901; 203/10, 26, 48, 203/98, DIG. 16; 210/664, 669, 747, 805, 210/806; 405/129.35; 588/250
See application file for complete search history.

(56) References Cited

U.S. PATENT DOCUMENTS 896,272 A 8/1908 Camors (Continued)

FOREIGN PATENT DOCUMENTS

CA 1166531 5/1984

(Continued)

OTHER PUBLICATIONS

Achieving Zero Liquid Discharge in SAGD Heavy Oil Recovery, W. Heims and K Schooley, Petroleum Society'Canadian International Petroleum Conference 2000; Calgary, Alberta, Jun. 11-13, 2002.*

(Continued)

*Primary Examiner*—George Suchfield
(74) *Attorney, Agent, or Firm*—R. Reams Goodloe, Jr.

(57) ABSTRACT

A process for treating produced water to generate high pressure steam. Produced water from heavy oil recovery operations is treated by first removing oil and grease. Pretreated produced water is then fed to an evaporator. Up to 95% or more of the pretreated produced water stream is evaporated to produce (1) a distillate having a trace amount of residual solutes therein, and (2) evaporator blowdown containing substantially all solutes from the produced water feed. The distillate may be directly used, or polished to remove the trace residual solutes before being fed to a steam generator. Steam generation in a packaged boiler, such as a water tube boiler having a steam drum and a mud drum with water cooled combustion chamber walls, produces 100% quality high pressure steam for down-hole use.

74 Claims, 8 Drawing Sheets

U.S. PATENT DOCUMENTS

| | | | |
|---|---|---|---|
| 2,091,898 A | 8/1937 | Weber | |
| 2,979,442 A | 4/1961 | Badger | |
| 3,192,130 A | 6/1965 | Pottharst, Jr. | |
| 3,193,009 A | 7/1965 | Wallace, et al. | |
| 3,353,593 A | 11/1967 | Boberg | |
| 3,377,273 A | 4/1968 | Glueckauf | |
| 3,399,975 A | 9/1968 | Otten | |
| 3,410,345 A | 11/1968 | Fradkin | |
| 3,414,507 A | 12/1968 | Calmon | |
| 3,476,183 A | 11/1969 | Haynes, Jr., et al. | |
| 3,514,376 A | 5/1970 | Salutsky | |
| 3,525,675 A | 8/1970 | Gaudin | |
| 3,586,090 A | 6/1971 | Henderson | |
| 3,714,985 A | 2/1973 | Bayless | |
| 3,725,268 A | 4/1973 | Gelblum | |
| 3,768,558 A | 10/1973 | Allen et al. | |
| 3,891,394 A | 6/1975 | Smith et al. | |
| 3,917,526 A | 11/1975 | Jennings | |
| 3,926,739 A | 12/1975 | Izumi | |
| 3,933,576 A | 1/1976 | Rushton | |
| 3,951,752 A | 4/1976 | Roller | |
| 3,951,753 A | 4/1976 | Roller | |
| 3,963,619 A | 6/1976 | Caillaud et al. | |
| 3,968,002 A | 7/1976 | Standiford | |
| 3,974,039 A | 8/1976 | Frohner et al. | |
| 4,030,985 A | 6/1977 | Barba et al. | |
| 4,054,493 A | 10/1977 | Roller | |
| 4,073,644 A | 2/1978 | Papafingos et al. | |
| 4,083,781 A | 4/1978 | Conger | |
| 4,090,916 A | 5/1978 | Papafingos et al. | |
| 4,105,556 A | 8/1978 | D'Amaddio et al. | |
| 4,119,149 A | 10/1978 | Wu et al. | |
| 4,260,461 A | 4/1981 | Pottharst | |
| 4,343,691 A | 8/1982 | Minkkinen | |
| 4,344,826 A | 8/1982 | Smith | |
| 4,370,858 A | 2/1983 | Awerbuch et al. | |
| 4,391,102 A | 7/1983 | Studhalter et al. | |
| 4,392,959 A | 7/1983 | Coillet | |
| 4,398,603 A | 8/1983 | Rodwell | |
| 4,444,680 A | 4/1984 | Kitzes et al. | |
| 4,458,520 A | 7/1984 | Adame et al. | |
| 4,472,355 A | 9/1984 | Hickam et al. | |
| 4,474,011 A | 10/1984 | Nelson et al. | |
| 4,475,595 A | 10/1984 | Watkins et al. | |
| 4,548,257 A | 10/1985 | Williamson | |
| 4,561,965 A | 12/1985 | Minkkinen | |
| 4,576,627 A | 3/1986 | Hughes | |
| 4,698,136 A | 10/1987 | El-Allawy | |
| 4,706,749 A | 11/1987 | Hayes et al. | |
| 4,877,536 A | 10/1989 | Bertness et al. | |
| 4,913,236 A | 4/1990 | Reed | |
| 4,967,837 A | 11/1990 | Danzik | |
| 5,250,151 A | 10/1993 | Huercanos | |
| 5,250,185 A | 10/1993 | Tao et al. | |
| 5,474,653 A | 12/1995 | Bostjancic | |
| 5,587,054 A | 12/1996 | Keith | |
| 5,683,587 A | 11/1997 | Ferrara et al. | |
| 5,695,643 A | 12/1997 | Brandt et al. | |
| 5,783,084 A | 7/1998 | Suenkonis | |
| 5,858,177 A | 1/1999 | Morris | |
| 5,932,074 A | 8/1999 | Hoiss | |
| 5,968,312 A | 10/1999 | Sephton | |
| 6,074,549 A | 6/2000 | Bacon Cochrane et al. | |
| 6,186,232 B1 | 2/2001 | Isaacs et al. | |
| 6,205,289 B1 | 3/2001 | Kobro | |
| 6,355,145 B1 | 3/2002 | Kresnyak et al. | |
| 6,365,005 B1 | 4/2002 | Schleiffarth | |
| 6,375,803 B1 | 4/2002 | Razzaghi et al. | |
| 6,536,523 B1 | 3/2003 | Kresnyak et al. | |
| 6,733,636 B1 | 5/2004 | Heins | |
| 6,849,155 B2 * | 2/2005 | Akita et al. | 159/44 |
| 6,929,753 B1 * | 8/2005 | Falcon | 210/760 |
| 6,949,192 B2 * | 9/2005 | Gsell | 210/650 |
| 6,960,301 B2 * | 11/2005 | Bradley | 210/663 |
| 6,984,292 B2 * | 1/2006 | Kresnyak et al. | 203/1 |
| 7,077,201 B2 * | 7/2006 | Heins | 166/266 |
| 7,150,320 B2 * | 12/2006 | Heins | 166/266 |
| 2003/0127226 A1 | 7/2003 | Heins | |
| 2003/0127400 A1 | 7/2003 | Kresnyak et al. | |
| 2005/0022989 A1 | 2/2005 | Heins | |
| 2005/0279500 A1 | 12/2005 | Heins | |
| 2006/0032630 A1 | 2/2006 | Heins | |

FOREIGN PATENT DOCUMENTS

| | | |
|---|---|---|
| CA | 2274258 | 7/1998 |
| CA | 2305118 | 5/2000 |
| CA | 2345595 | 11/2001 |
| CA | 2305118 | 3/2002 |
| EP | 0916622 B1 | 7/2002 |
| GB | 935178 | 8/1963 |
| SU | 632655 | 11/1978 |
| WO | WO98/31445 | 7/1998 |
| WO | WO2004/035479 A1 | 4/2004 |
| WO | WO2005/054746 A2 | 6/2005 |

OTHER PUBLICATIONS

News Release Transmitted by Canadian Corporate News For: Aqua Pure Ventures, Inc., Oct. 14, 1998, CCN Home Page site Map, Mar. 3, 1999, (2 pages).

The Aqua Pure System: Pure Water Recovery, (Web Page); http://www.aqua-pure.com, Mar. 3, 1999, (5 pages).

Becker, R.F. (Bob);Kresnyak, Steve; A Unique Mechanical Vapour Recompression / Distillation Process for Purifying Water, Colt Engineering Corporation, Calgary, Alberta, Canada, Mar. 3, 1999, (9 pages).

Heins, W., Achieving Zero Liquid Discharge in the Heavy Oil Recovery Industry. Oil Sands Process Water Workshop, May 8, 2001, Fort McMurray, Alberta.

Heins, W., and Schooley, K., Achieving Zero Liquid Discharge in SAGD Heavy Oil Recovery, Petroleum Society's Canadian International Petroleum Conference 2002; Calgary, Alberta, Jun. 11-13, 2002. (10 pages).

Heins, W., and Schooley, K., Achieving Zero Liquid Discharge in SAGD Heavy Oil Recovery, Journal of Canadian Petroleum Technology, Aug. 2004, vol. 43, No. 8. (pp. 37-42).

Heins, W., Peterson, D., Use of Evaporation for Heavy Oil Produced Water Treatment, Ionics RCC. Canadian International Petroleum Conference, Paper No. 2003-178 ("This paper is to be presented at the Petroleum Society's Canadian International Petroleum Conference 2003, Calgary, Alberta, Canada, Jun. 10-12, 2003").

Heins, W., McNeill, R., Albion, S., World's First SAGD Facility Using Evaporators, Drum Boilers, and Zero Discharge Crystallizers to Treat Produced Water, Canadian International Petroleum Conference, Paper No. 2005-115, Petroleum Society, Jun. 2005.

Heins, W.F., Start-Up, Commissioning, and Operational Data From the World's First SAGD Facilities Using Evaporators to Treat Produced Water for Boiler Feedwater, Canadian International Petroleum Conference, Paper No. 2006-183, Petroleum Society, Jun. 2006.

Heins, W.F., Is A Paradigm Shift in Produced Water Treatment Technology Occurring At SAGD Facilities?, Canadian International Petroleum Conference, Paper No. 2007-213, Petroleum Society, Jun. 2007.

Kok,S., Zaidi, A., and Solomon, R., Total dissolved Solids Removal From Water Produced During the In Situ Recovery of Heavy Oil and Bitumen, Preprint, Petroleum Society of CIM, Paper No. 86-37-64, Jun. 1986, (pp. 367-373).

Kok,S., Zaidi, A., and Solomon, R., Total dissolved Solids Removal From Water Produced During The In Situ Recovery of Heavy Oil and Bitumen, Advances in the Thermal Recovery, The Journal of Canadian Petroleum Technology, vol. 26, No. 1, pp. 100-105, Jan. 1989.

Smith, Maurice, Watershed Moment, SAGD Operators Embrace New Water Treatment Options, Nickle's New Technology Magazine, Oct. 2007.

Smith, Maurice, Bridge Over Troubled Water, Simplifying Water Purification for Increasingly Thirsty Oilsands Extractors, (Web Page); www.ntm.nickles.com/New Technology Magazine, Jul./Aug. 2001 (pp. 37-39).

Solomon, R.L, and Schooley, K.E., Recycling Oil-field Produced Waters Using Evaporation Technology, American Filtration Society, National Fall Meeting, Oct. 29-30, 1990, Baton Rouge, Louisiana. (11 pages including tables and Figures).

Zaidi, Abbas and Kok, Sandra, Recent Advances in the Treatment of Water from In-Situ Heavy Oil Recovery, Environment Canada, Wastewater Technology Center, Second Canada-China Heavy Oil Technology Symposium Proceedings, Oct. 1990, (Presentation).

Zaidi, Abbas and Kok, Sandra, Recent Advances in the Treatment of Water from In-Situ Heavy Oil Recovery, Environment Canada, Wastewater Technology Center, Second Canada-China Heavy Oil Technology Symposium Proceedings-Reprint, (1990).

Zalewski, W.; Averill, R.; Arychuk, G., Produced Water Recycyling At BF Resources—Petro Canada's Wolf Lake Plant, Mar. 14, 1991.

* cited by examiner

FIG. 6

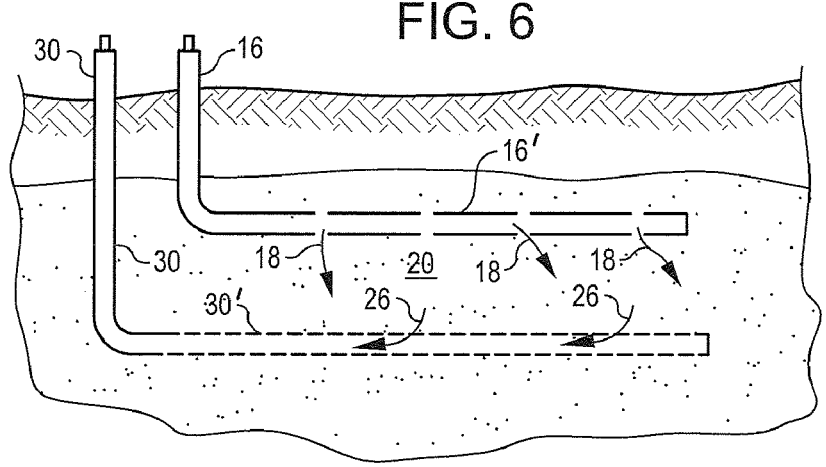

FIG. 7
TYPICAL FEEDWATER REQUIREMENTS

| Constituent | Packaged Boilers | Units |
|---|---|---|
| Hardness | < 0.05 mg/l | as CaCO3 * |
| Non-volatile TOC | < 0.20 mg/l | as C |
| Oil & Grease | < 0.20 mg/l | as substance |
| pH | 8.8 to 9.6 | pH |
| Cu | < 0.01 mg/l | as Cu |
| Fe | < 0.01 mg/l | as Fe |
| $O_2$ | < 0.007 mg/l | as $O_2$ |
| * Hardness | Non-detectable when P>1000psig | |

FIG. 8
TYPICAL FEEDWATER REQUIREMENTS

| Constituent | ONCE-THROUGH Steam Generators | Units |
|---|---|---|
| Hardness | < 1.0 mg/L | as $CaCO_3$ |
| Non-volatile TOC | Reasonable | as C |
| Oil & Grease | < 0.5 mg/L | as substance |
| pH | 7.5 to 9.0 | pH |
| TDS | < 12,000 mg/L | as $CaCO_3$ equivalent |
| $O_2$ | negligible | as $O_2$ as |
| Fe | <0.25 mg/L | as Fe |
| $SiO_2$ | <100mg/L | as $SiO_2$ |

SIMPLIFIED VAPOR COMPRESSION FALLING FILM EVAPORATOR SYSTEM

VERTICAL TUBE FALLING FILM VAPOR COMPRESSION EVAPORATOR SCHEMATIC

SILICA SOLUBILITY CHARACTERISTICS

US 7,428,926 B2

WATER TREATMENT METHOD FOR HEAVY OIL PRODUCTION

RELATED PATENT APPLICATIONS

This application is a Continuation-In-Part of prior U.S. patent application Ser. No. 10/868,745, filed Jun. 9, 2004, now U.S. Pat. No. 7,150,320 which was a Continuation-In-Part of prior U.S. patent application Ser. No. 10/307,250, filed Nov. 30, 2002, now U.S. Pat. No. 7,077,201 which was a Continuation-In-Part of prior U.S. patent application Ser. No. 09/566,622, filed May 8, 2000, now U.S. Pat. No. 6,733, 636B1 issued May 11, 2004, entitled WATER TREATMENT METHOD FOR HEAVY OIL PRODUCTION, which claimed priority from prior U.S. Provisional Patent Application Ser. No. 60/133,172, filed on May 7, 1999. Also, this application claims priority from U.S. Provisional Patent Application Ser. No. 60/578,810, filed Jun. 9, 2004. The disclosures of each of the above identified patents or patent applications are incorporated herein in their entirety by this reference, including the specification, drawing, and claims of each patent or application.

COPYRIGHT RIGHTS IN THE DRAWING

A portion of the disclosure of this patent document contains material that is subject to copyright protection. The applicant no objection to the facsimile reproduction by anyone of the patent document or the patent disclosure, as it appears in the Patent and Trademark Office patent file or records, but otherwise reserves all copyright rights whatsoever.

TECHNICAL FIELD

The invention disclosed and claimed herein relates to treatment of water to be used for steam generation in operations which utilize steam to recover oil from geological formations. More specifically, this invention relates to novel, improved techniques for efficiently and reliably generating from oil field produced waters, in high pressure steam generators, the necessary steam for down-hole use in heavy oil recovery operations.

BACKGROUND

Steam generation is necessary in heavy oil recovery operations. This is because in order to recover heavy oil from certain geologic formations, steam is required to increase the mobility of the sought after oil within the formation. In prior art systems, oil producers have often utilized once-through type steam generators ("OTSG's). As generally utilized in the industry, once through steam generators—OTSG's—usually have high blowdown rates, often in the range of from about 20% to about 30% or thereabouts. Such a blowdown rate leads to significant thermal and chemical treatment inefficiencies. Also, once through steam generators are most commonly provided in a configuration and with process parameters so that steam is generated from a feedwater in a single-pass operation through boiler tubes that are heated by gas or oil burners. Typically, such once through steam generators operate at from about 1000 pounds per square inch gauge (psig) to about 1600 psig or so. In some cases, once through steam generators are operated at up to as much as about 1800 psig. Such OTSG's often operate with a feedwater that has from about 2000 mg/L to about 8000 mg/L of total dissolved solids. As noted in FIG. 1, which depicts the process flow sheet of a typical prior art water treatment system 10, such a once through steam generator 12 provides a low quality or wet steam, wherein about eighty percent (80%) quality steam is produced. In other words, the 80% quality steam 14 is about 80% vapor, and about 20% liquid, by weight percent. The steam portion, or high pressure steam produced in the steam generators is injected via steam injection wells 16 to fluidize as indicated by reference arrows 18, along or in combination with other injectants, the heavy oil formation 20, such as oils in tar sands formations. The injected steam 14 eventually condenses and an oil/water mixture 22 results, and which mixture migrates through the formation 20 as indicated by reference arrows 24. The oil/water mixture 22 is gathered as indicated by reference arrows 26 by oil/water gathering wells 30, through which the oil/water mixture is pumped to the surface. Then, the sought-after oil is sent to an oil/water separator 32 in which the oil product 34 separated from the water 35 and recovered for sale. The produced water stream 36, after separation from the oil, is further de-oiled in a de-oiling process step 40, normally by addition of a de-oiling polymer 42 or by other appropriate processes. Such a de-oiling process usually results in generation of an undesirable waste oil/solids sludge 44. However, the de-oiled produced water stream 46 is then further treated for reuse.

The design and operation of the water treatment plant which treats the de-oiled produced water stream 46, i.e., downstream of the de-oiling unit 40 and upstream of injection well 16 inlet 48, is the key to the improvement(s) described herein.

Most commonly in prior art plants such as plant 10, the water is sent to the "once-through" steam generators 12 for creation of more steam 14 for oil recovery operations. The treated produced water stream 12F which is the feed stream for the once through steam generator, at time of feed to the steam generator 12, is typically required to have less than about 8000 parts per million ("PPM") of total dissolved solids ("TDS"). Less frequently, the treated produced water stream 12F may have up to about 12000 parts per million (as CaCO3 equivalent) of total dissolved solids, as noted in FIG. 8. Further, it is often necessary to meet other specific water treatment parameters before the water can be reused in such once-through steam generators 12 for the generation of high pressure steam.

In most prior art water treatment schemes, the de-oiled recovered water 46 must be treated in a costly water treatment plant sub-system 10 before it can be sent to the steam generators 12. Treatment of water before feed to the once-through steam generators 12 is often initially accomplished by using a warm lime softener 50, which removes hardness, and which also removes some silica from the de-oiled produced water feedstream 46. Various softening chemicals 52 are usually necessary, such as lime, flocculating polymer, and perhaps soda ash. Underflow 56 produces a waste sludge 58 which must be further handled and disposed. Then, an "after-filter" 60 is often utilized on the clarate stream 59 to prevent carry-over of any precipitate or other suspended solids, which substances are thus accumulated in a filtrate waste stream 62. For polishing, an ion exchange step 64, normally including a hardness removal step such as a weak acid cation (WAC) ion-exchange system that can be utilized to simultaneously remove hardness and the alkalinity associated with the hardness, is utilized. The ion exchange systems 64 require regeneration chemicals 66 as is well understood by those of ordinary skill in the art and to which this disclosure is directed. As an example, however, a WAC ion exchange system is usually regenerated with hydrochloric acid and caustic, resulting in the creation of a regeneration waste stream 68. Overall, such prior art water treatment plants are relatively simple, but, result in a multitude of liquid waste streams or solid waste sludges that must be further handled, with significant additional expense.

In one relatively new heavy oil recovery process, known as the steam assisted gravity drainage heavy oil recovery process (the "SAGD" process), it is preferred that one hundred percent (100%) quality steam be provided for injection into wells (i.e., no liquid water is to be provided with the steam to be injected into the formation). Such a typical prior art system 11 is depicted in FIG. 2. However, given conventional prior art water treatment techniques as just discussed in connection with FIG. 1, the 100% steam quality requirement presents a problem for the use of once through steam generators 12 in such a process. That is because in order to produce 100% quality steam 70 using a once-through type steam generator 12, a vapor-liquid separator 72 is required to separate the liquid water from the steam. Then, the liquid blowdown 73 recovered from the separator is typically flashed several times in a series of flash tanks $F_1$, $F_2$, etc. through $F_N$ (where N is a positive integer equal to the number of flash tanks) to successively recover as series of lower pressure steam flows $S_1$, $S_2$, etc. which may sometimes be utilized for other plant heating purposes. After the last flashing stage $F_N$, a residual hot water final blowdown stream 74 must then be handled, by recycle and/or disposal. The 100% quality steam is then sent down the injection well 16 and injected into the desired formation 20. Fundamentally, though, conventional treatment processes for produced water used to generate steam in a once-through steam generator produces a boiler blowdown which is roughly twenty percent (20%) of the feedwater volume. This results in a waste brine stream that is about fivefold the concentration of the steam generator feedwater. Such waste brine stream must be disposed of by deep well injection, or if there is limited or no deep well capacity, by further concentrating the waste brine in a crystallizer or similar system which produces a dry solid for disposal.

As depicted in FIG. 3, another method which has been proposed for generating the required 100% quality steam for use in the steam assisted gravity drainage process involves the use of boilers 80, which may be packaged, factory built boilers of various types or field assembled boilers with mud and steam drums and water wall piping. Various methods can be used for producing water of a sufficient quality to be utilized as feedwater 80F to a boiler 80. One method which has been developed for use in heavy oil recovery operations involves de-oiling 40 of the produced water 36, followed by a series of physical-chemical treatment steps. Such treatment steps normally include a series of unit operations as warm lime softening 54, followed by filtration 60 for removal of residual particulates, then an organic trap 84 (normally non-ionic ion exchange resin) for removal of residual organics. The organic trap 84 may require a regenerant chemical supply 85, and, in any case, produces a waste 86, such as a regenerant waste. Then, a pre-coat filter 88 can be used, which has a precoat filtrate waste 89. In one alternate embodiment, an ultrafiltration ("UF") unit 90 can be utilized, which unit produces a reject waste stream 91. Then, effluent from the UF unit 90 or precoat filter 88 can be sent to a reverse osmosis ("RO") system 92, which in addition to the desired permeate 94, produces a reject liquid stream 96 that must be appropriately handled. Permeate 94 from the RO system 92, can be sent to an ion exchange unit 100, typically but not necessarily a mixed bed demineralization unit, which of course requires regeneration chemicals 102 and which consequently produces a regeneration waste 104. And finally, the boiler 80 produces a blowdown 110 which must be accommodated for reuse or disposal.

The prior art process designs, such as depicted in FIG. 3, for utilizing packaged boilers in heavy oil recovery operations, have a high initial capital cost. Also, such a series of unit process steps involves significant ongoing chemical costs. Moreover, there are many waste streams to discharge, involving a high and ongoing sludge disposal cost. Further, where membrane systems such as ultrafiltration 90 or reverse osmosis 92 are utilized, relatively frequent replacement of membranes 106 or 108, respectively, may be expected, with accompanying on-going periodic replacement costs. Also, such a process scheme can be labor intensive to operate and to maintain.

In summary, the currently known and utilized methods for treating heavy oil field produced waters in order to generate high quality steam for down-hole use are not entirely satisfactory because:

such physical-chemical treatment process schemes are usually quite extensive, are relatively difficult to maintain, and require significant operator attention;

such physical-chemical treatment processes require many chemical additives which must be obtained at considerable expense, and many of which require special attention for safe handling;

such physical-chemical treatment processes produce substantial quantities of undesirable sludges and other waste streams, the disposal of which is increasingly difficult, due to stringent environmental and regulatory requirements.

It is clear that the development of a simpler, more cost effective approach to produced water treatment would be desirable in the process of producing steam in heavy oil production operations. Thus, it can be appreciated that it would be advantageous to provide a new produced water treatment process which minimizes the production of undesirable waste streams, while minimizing the overall costs of owning and operating a heavy oil recovery plant.

SOME OBJECTS, ADVANTAGES, AND NOVEL FEATURES

The new water treatment process(es) disclosed herein, and various embodiments thereof, can be applied to heavy oil production operations. Such embodiments are particularly advantageous in they minimize the generation of waste products, and are otherwise superior to water treatment processes heretofore used or proposed in the recovery of bitumen from tar sands or other heavy oil recovery operations.

From the foregoing, it will be apparent to the reader that one of the important and primary objectives resides in the provision of a novel process, including several variations thereof, for the treatment of produced waters, so that such waters can be re-used in producing steam for use in heavy oil recovery operations.

Another important objective is to simplify process plant flow sheets, i.e., minimize the number of unit processes required in a water treatment train, which importantly simplifies operations and improves quality control in the manufacture of high purity water for down-hole applications.

Other important but more specific objectives reside in the provision of various embodiments for an improved water treatment process for production of high purity water for down-hole use in heavy oil recovery, which embodiments may:

in one embodiment, eliminate the requirement for flash separation of the high pressure steam to be utilized downhole from residual hot pressurized liquids;

eliminate the generation of softener sludges;

minimize the production of undesirable liquid or solid waste streams;

minimize operation and maintenance labor requirements;

minimize maintenance materiel requirements;

minimize chemical additives and associated handling requirements;

increase reliability of the OTSG's, when used in the process;

decouple the de-oiling operations from steam production operations; and reduce the initial capital cost of water treatment equipment.

Other important objectives, features, and additional advantages of the various embodiments of the novel process disclosed herein will become apparent to the reader from the foregoing and from the appended claims and the ensuing detailed description, as the discussion below proceeds in conjunction with examination of the accompanying drawing.

BRIEF DESCRIPTION OF THE DRAWING

In order to enable the reader to attain a more complete appreciation of the novel water treatment process disclosed and claimed herein, and the various embodiments thereof, and of the novel features and the advantages thereof over prior art processes, attention is directed to the following detailed description when considered in connection with the accompanying figures of the drawing, wherein:

FIG. 6 shows a common variation for the orientation of injection and gathering wells as utilized in heavy oil recovery, specifically showing the use of horizontal steam injection wells and of horizontal oil/water gathering wells, as often employed in a steam assisted gravity drainage heavy oil gathering project.

FIG. 7 shows the typical feedwater quality requirements for steam generators which produce steam in the 1000 pounds per square inch gauge range, or thereabouts, for conventional steam boiler installations.

FIG. 8 shows the typical feedwater quality requirements for steam generators which produce steam in the 1000 pounds per square inch gauge range, or thereabouts, for once-through type steam generator installations.

The foregoing figures, being merely exemplary, contain various elements that may be present or omitted from actual process implementations depending upon the circumstances. An attempt has been made to draw the figures in a way that illustrates at least those elements that are significant for an understanding of the various embodiments and aspects of the invention. However, various other elements of the unique process methods, and the combination of apparatus for carrying out the methods, are also shown and briefly described to enable the reader to understand how various features, including optional or alternate features, may be utilized in order to provide an efficient, low cost process design which can be implemented in a desired throughput size and physical configuration for providing optimum water treatment plant design and operation.

DESCRIPTION

Many steam assisted heavy oil recovery schemes, such as a steam assisted gravity drainage (SAGD) heavy oil recovery process injection and recovery well arrangements of the type depicted in FIG. 6, most efficiently utilize a 100% quality steam supply 70. It would therefore be desirable to produce such a steam supply by an efficient process scheme such as I have found may be provided by evaporation based heavy oil produced water treatment method(s). Various embodiments and details of such evaporation based produced water treatment method(s) are depicted in FIGS. 4, 5, 6, 9, 10 and 12.

Figure 4:
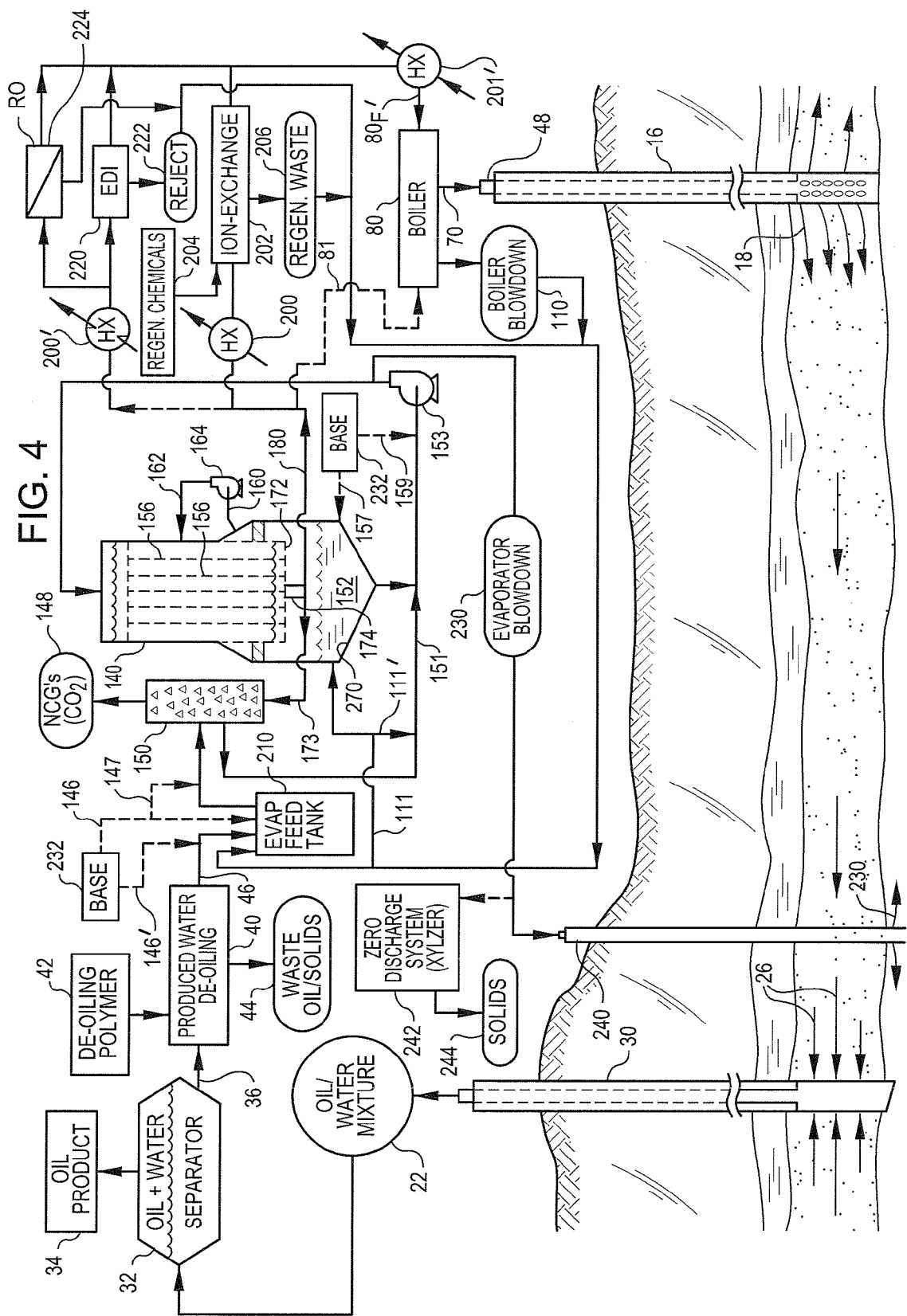
FIG. 4 shows one embodiment of an evaporation based water treatment process, illustrating the use of the evaporation based process in combination with the use of packaged boilers for steam production, as applied to heavy oil recovery operations.
Figure 5:
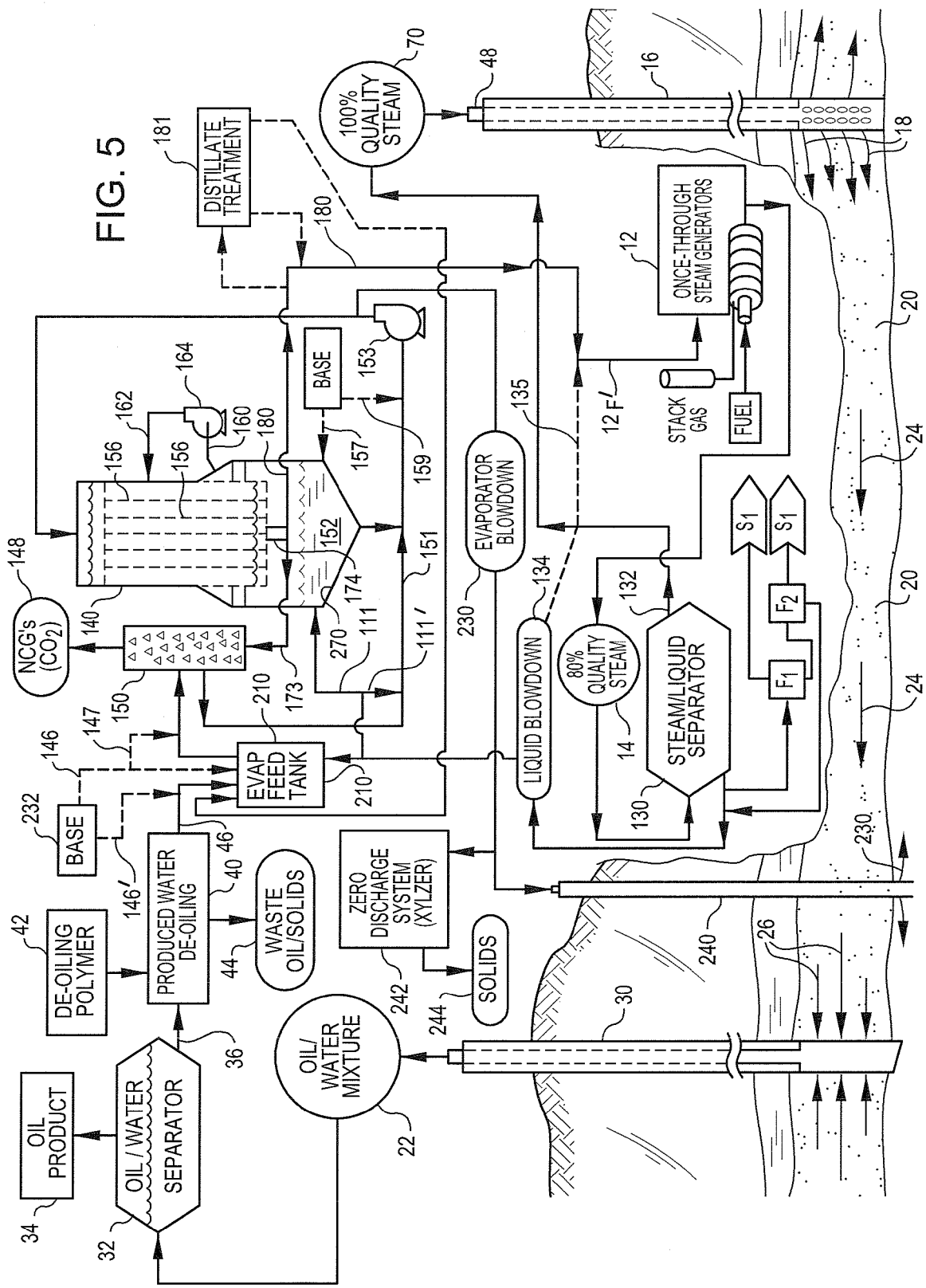
FIG. 5 shows another embodiment for an evaporation based water treatment process for heavy oil production, illustrating the use of the process in combination with the use of once-through steam generators for steam production, as applied to heavy oil recovery operations, which process is characterized by feed of evaporator distillate to once-through steam generators without the necessity of further pretreatment.
Figure 9:
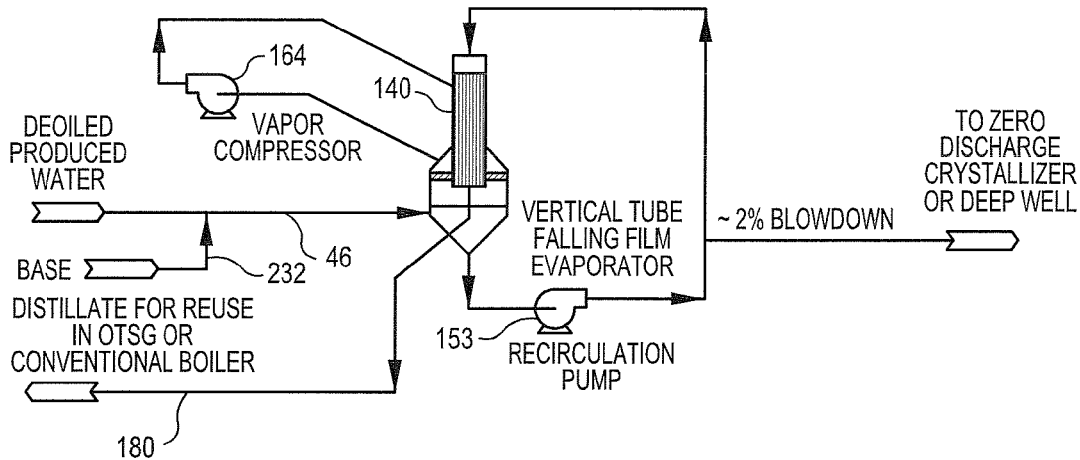
FIG. 9 provides a simplified view of a vertical tube falling film evaporator operating a high pH in the treatment of produced water from heavy oil operations, for production of distillate for reuse in once through steam generators or in conventional steam boilers.

As depicted in FIG. 6, in a SAGD process, horizontal injection wells 16' and horizontal oil/water gathering wells 30' are advantageously utilized spaced apart within an oil bearing formation 20. As particularly illustrated in FIGS. 4 and 5, a process for the use of an evaporation based water treatment system 120 has been developed to treat produced water, in order to produce high quality steam for use in further heavy oil recovery. Conceptually, such an evaporative water treatment process may, in one embodiment, be situated process wise—that is, water flow wise—between the point of receipt of a de-oiled produced water stream 46 and the point of steam injection at well head 48 of injection well 16. The process, in combination with the steam injection well 16, oil recovery well 30, and related oil water separation equipment 32 and de-oiling equipment 40, and boilers 80 as shown in FIG. 4, or alternately, once through steam generators 12 as shown in FIG. 5, can substantially reduce capital costs and can minimize ongoing operation and maintenance costs of heavy oil recovery installations. Boilers 80 may be packaged, factory built boilers of various types or field assembled boilers with mud and steam drums and water wall piping, or more generally, conventional steam boilers. In some locales, such as northern Canada, the possibility of elimination of the need for handling of waste sludges and other waste streams made possible by the evaporation based, water treatment system 120 may be especially important, since it may be difficult to work with such waste materials during the extremely cold winter months.

It has been observed that it may be desirable in some instances to use a packaged boiler 80 to produce the required steam 70, rather than to utilize a traditional once-through type steam generator 12 to produce 80% quality steam 14 and then utilize separator(s) 130 to separate steam 132 from liquid 134. It is noteworthy in such an economic process evaluation that packaged boilers 80 are often less expensive on a capital cost basis and on an operating cost basis than once-through type oil-field steam generators 12. Also, package boilers can be utilized to produce pure steam 70, and thus produce only a minimal liquid blowdown stream 110. Also, as shown in FIGS. 4 and 5, boiler blowdown stream can be either sent to the evaporator feed tank 210, or injected into the sump reservoir 152 of evaporator 140, such as via line 111, or into the recirculating brine via line 111'. One type of packaged boiler suitable for use in the process described herein is a water tube boiler having a lower mud drum and an upper steam drum and water cooled sidewalls substantially extending therebetween in a manner which encloses a combustion chamber. However, most such packaged boilers require a much higher quality feed water 80F than is the case with requirements for feedwater 12F for a once-through type steam generator. As a result, in one embodiment, the process disclosed herein includes an evaporation unit 140 based approach to packaged boiler 80 feedwater 80F pretreatment. In other words, the de-oiled produced water 46 generated can be advantageously treated by an evaporative process operating at elevated pH, and provides a significantly improved method for produced water treatment in heavy oil production.

An oil/water mixture 22 is pumped up through oil gathering wells 30. The oil water mixture 22 is sent to a series of oil/water separators 32. An oil product 34 is gathered for further conditioning, transport, and sale. The produced water 36 which has been separated from the oil/water mixture 22 is then sent to a produced water de-oiling step 40, which may be accomplished in dissolved air flotation units with the assistance of the addition of a de-oiling polymer 42, or by other appropriate unit processes.

In the water treatment method disclosed herein, the de-oiled produced water 46 is treated and conditioned for feed to one or more mechanical vapor recompression evaporator units 140 (normally, multiple redundant units) to concentrate the incoming produced water stream 46. The necessary treatment and conditioning prior to the evaporator unit 140 can be efficiently accomplished, but may vary somewhat based on feedwater chemistry—i.e. the identity and distribution of various dissolved and suspended solids—and on the degree of concentration selected for accomplishment in evaporator units 140.

Figure 10:
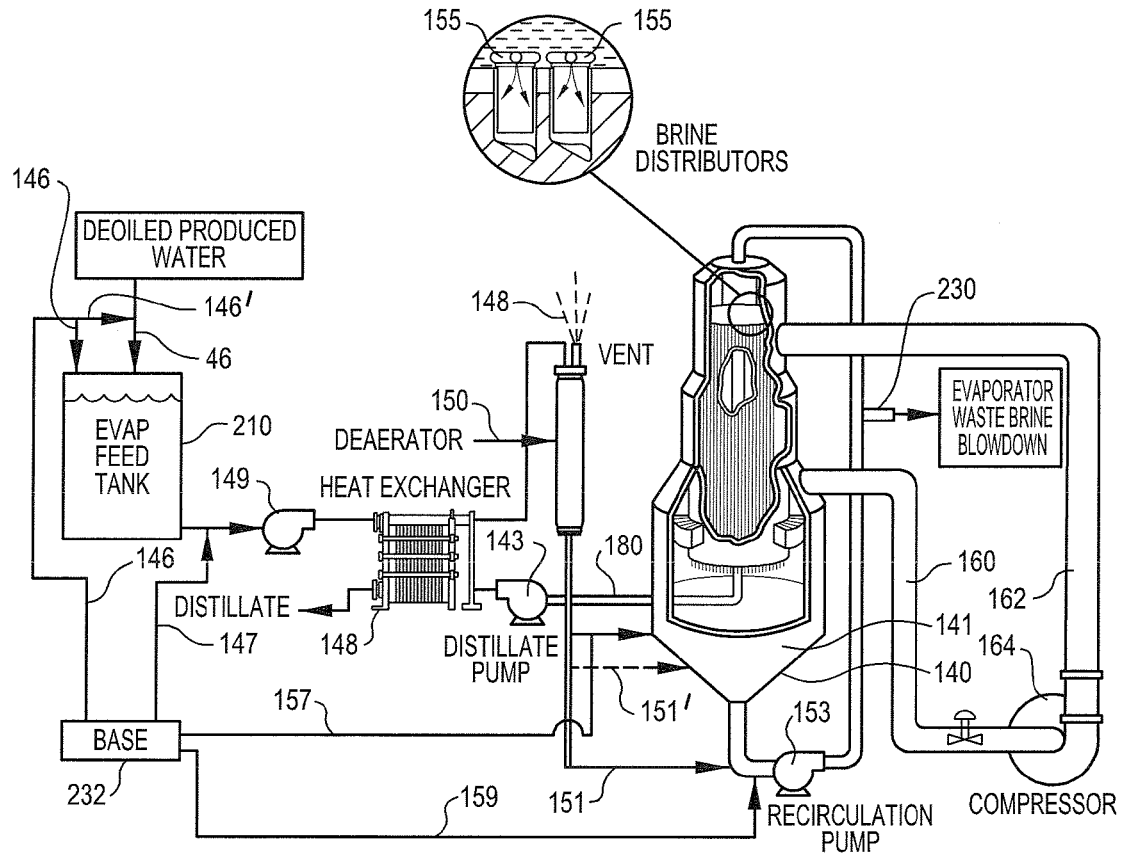
FIG. 10 shows further details of the use of evaporators at high pH, illustrated by use of falling film evaporators, and indicates selected injection points for caustic injection to raise the pH of the concentrated brine to maintain solubility of silica in the concentrated brine.

In the usual case, it may be necessary or appropriate to add a selected base such as caustic 232 via line 146 to the evaporator feed tank 210, or by line 147 to a point upstream of the feedwater heat exchanger 148, such as before the suction of pump 149 as seen in FIG. 10, in order to avoid silica scaling in the feedwater deaerator 150 and the feed heat exchanger 148. Moreover, feed of a selected base such as caustic 232 to the evaporator feed tank 210 via line 146 or to another point upstream of the feedwater heat exchanger 148 via line 147 can be utilized to raise the pH of the concentrated brine recirculating in the evaporator 140. Also, raising the pH of the concentrated brine recirculating in the evaporator can be accomplished by direct injection of a selected base such as caustic 232 into the sump 141, as indicated by line 157, or by feed of a selected base such as caustic 232 into the suction of recirculation pump 153, as indicated by line 159. Moreover, in one embodiment, it may be advantageous to use addition of a selected base such as caustic 232 to the feed tank 210 such as by line 146 as the primary method for raising the pH of the recirculating brine in the sump of the evaporator 140 to a desired pH level, and to use addition of a selected base such as caustic 232 to the evaporator sump 141, such as by line 157 or line 159, as a pH trim control to fine tune the pH of the brine 152 in sump 140 and thus of recirculating brine 162. Also, the selected base such as caustic 232 can be added at an appropriate point upstream of the feed tank 210 when desired such as via line 146'.

At feedwater heat exchanger, the feedwater pump 149 is used to provide sufficient pressure to send feedwater from the evaporator feed tank 210 through the feedwater heat exchanger 148, prior to the deaerator 150. In the opposite direction, the distillate pump 143 moves distillate 180 through the feedwater heat exchanger 148, so that the hot distillate is used to heat the feedwater stream directed toward the deaerator 150.

Figure 12:
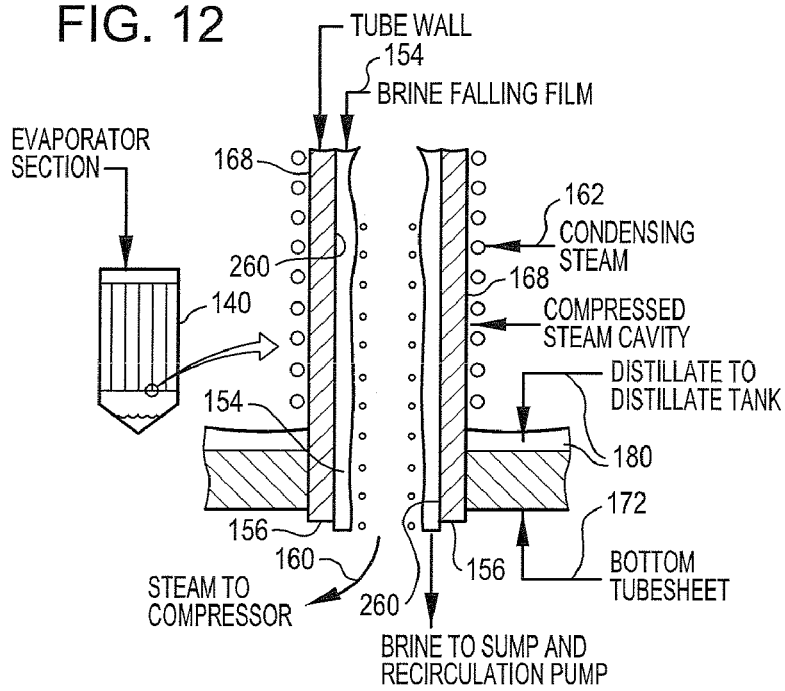
FIG. 12 diagrammatically illustrates functional internal details of the operation of a falling film evaporator, which evaporator type would be useful in the evaporation of produced waters from heavy oil production; details illustrated include the production of steam from a falling brine film, by a heat exchange relationship from condensation of steam on a heat exchange tube, and the downward flow of such steam condensate (distillate) by gravity for the collection of such condensate (distillate) above the bottom tube sheet of the evaporator.

The conditioned feedwater 151 is sent as feedwater to evaporator 140. The conditioned feedwater 151 may be directed to the inlet of recirculation pump 153, or alternately, directed to the sump 141 of evaporator 140 as indicated by broken line 151' in FIG. 10. Concentrated brine 152 in the evaporator 140 is recirculated via pump 153, so only a small portion of the recirculating concentrated brine is removed on any one pass through the evaporator 140. In the evaporator 140, the solutes in the feedwater 46 are concentrated via removal of water from the feedwater 46. As depicted in FIGS. 10 and 12, an evaporator 140 is in one embodiment provided in a falling film configuration wherein a thin brine film 154 is provided by distributors 155 and then falls inside of a heat transfer element, e.g. tube 156. A small portion of the water in the thin brine film 154 is extracted in the form of steam 160, via heat given up from heated, compressed steam 162 which is condensing on the outside of heat transfer tubes 156. Thus, the water is removed in the form of steam 160, and that steam is compressed through the compressor 164, and the compressed steam 162 is condensed at a heat exchange tube 156 in order to produce yet more steam 160 to continue the evaporation process. The condensing steam on the outer wall 168 of heat transfer tubes 156, which those of ordinary skill in the evaporation arts and to which this disclosure is directed may variously refer to as either condensate or distillate 180, is in relatively pure form, low in total dissolved solids. In one embodiment, such distillate contains less than 10 parts per million of total dissolved solids of non-volatile components. Since, as depicted in the embodiments shown in FIGS. 4, 5, 9, and 10, a single stage of evaporation is provided, such distillate 180 may be considered to have been boiled, or distilled, once, and thus condensed but once.

It is to be understood that the falling film evaporator 140 design is provided only for purposes of illustration and thus enabling the reader to understand the water treatment process (es) taught herein, and is not intended to limit the process to the use of such evaporator design, as those in the art will recognize that other designs, such as, for example, a forced circulation evaporator, or a rising film evaporator, may be alternately utilized with the accompanying benefits and/or drawbacks as inherent in such alternative evaporator designs.

In any event, in a falling film evaporator embodiment, the distillate 180 descends by gravity along tubes 156 and accumulates above bottom tube sheet 172, from where it is collected via condensate line 174. A small portion of steam in equilibrium with distillate 180 may be sent via line 173 to the earlier discussed deaerator 150 for use in mass transfer, i.e, heating and steam stripping descending liquids in a packed tower to remove non-condensable gases 148 such as carbon dioxide. However, the bulk of the distillate 180 is removed as a liquid via line 180', and may optionally be sent for further treatment in a distillate treatment plant, for example such as depicted in detail in FIG. 4, or as merely depicted in functional form as plant 181 in FIG. 5, to ultimately produce a suitable feedwater, such as feedwater 80F' in the case where packaged boilers 80 are utilized as depicted in FIG. 4. As shown in the embodiment set forth in FIG. 5, the distillate treatment plant 181 is optional, especially in the case of the use of once through steam generators, and in such instance the distillate 180 may often be sent directly to once-through steam generators as feedwater 12F' (as distinguished from the higher quality from feedwater 12F discussed hereinabove with respect to prior art processes) for generation of 80% quality steam 14. Also, as shown in FIG. 4, a distillate treatment plant 181 may also be optional in some cases, depending on feedwater chemistry, and in such cases, distillate 180 may be fed directly to boiler 80 as indicated by broken line 81.

In an embodiment where boilers 80 are used rather than once through steam generators 12, however, it may be necessary or desirable to remove the residual organics and other residual dissolved solids from the distillate 180 before feed of distillate 180 to the boilers 80. For example, as illustrated in FIG. 4, in some cases, it may be necessary to remove residual ions from the relatively pure distillate 180 produced by the evaporator 140. In most cases the residual dissolved solids in the distillate involve salts other than hardness. In one embodiment, removal of residual dissolved solids can be accomplished by passing the evaporator distillate 180, after heat exchanger 200, through an ion exchange system 202. Such ion-exchange systems may be of mixed bed type or include an organic trap, and directed to remove the salts and/or organics of concern in a particular water being treated. In any event, regenerant chemicals 204 will ultimately be required, which regeneration results in a regeneration waste 206 that must be further treated. Fortunately, in the process scheme described herein, the regeneration waste 206 can be sent back to the evaporator feed tank 210 for a further cycle of treatment through the evaporator 140.

In another embodiment, removal of residual dissolved solids can be accomplished by passing the evaporator distillate 180 through a heat exchanger 200' and then through electrodeionization (EDI) system 220. The EDI reject 222 is also capable of being recycled to evaporator feed tank 210 for a further cycle of treatment through the evaporator 140.

The just described novel combination of process treatment steps produces feedwater of sufficient quality, and in economic quantity, for use in packaged boilers 80 in heavy oil recovery operations. Advantageously, when provided as depicted in FIG. 4 a single liquid waste stream is generated, namely evaporator blowdown 230, which contains the concentrated solutes originally present in feedwater 46, along with additional contaminants from chemical additives (such as sodium hydroxide or caustic 232, when utilized to elevate the pH of recirculating brine 152, or regeneration chemicals 204). Also, in many cases, even the evaporator blowdown 230 can be disposed in an environmentally acceptable manner, which, depending upon locale, might involve injection in deep wells 240. Alternately, evaporation to complete dryness in a zero discharge system 242, such as a crystallizer or drum dryer, to produce dry solids 244 for disposal, may be advantageous in certain locales.

Various embodiments for new process method(s), as set forth in FIGS. 4 and 5 for example, are useful in heavy oil production since they generally offer one or more of the following advantages: (1) eliminate many physical-chemical treatment steps commonly utilized previously in handing produced water (for example, lime softening, filtrating, ion exchange systems, and certain de-oiling steps are eliminated); (2) result in lower capital equipment costs, since the evaporative approach to produced water treatment results in a zero liquid discharge system footprint size that is about 80% smaller than that required if a prior art physical-chemical treatment scheme is utilized, as well as eliminating vapor/liquid separators and reducing the size of the boiler feed system by roughly 20%; (3) result in lower operating costs for steam generation; (4) eliminate the production of softener sludge, thus eliminating the need for the disposal of the same; (5) eliminate other waste streams, thus minimizing the number of waste streams requiring disposal; (6) minimize the materiel and labor required for maintenance; (7) reduce the size of water de-oiling equipment in most operations; and (8) decouple the de-oiling operations from the steam generation operations.

One of the significant economic advantages of using a vertical tube, falling film evaporator such as of the type described herein is that the on-line reliability and redundancy available when multiple evaporators are utilized in the treatment of produced water. An evaporative based produced water treatment system can result in an increase of from about 2% to about 3% or more in overall heavy oil recovery plant availability, as compared to a produced water treatment system utilizing a conventional prior art lime and clarifier treatment process approach. Such an increase in on-line availability relates directly to increased oil production and thus provides a large economic advantage over the life of the heavy oil recovery plant.

Figure 1:
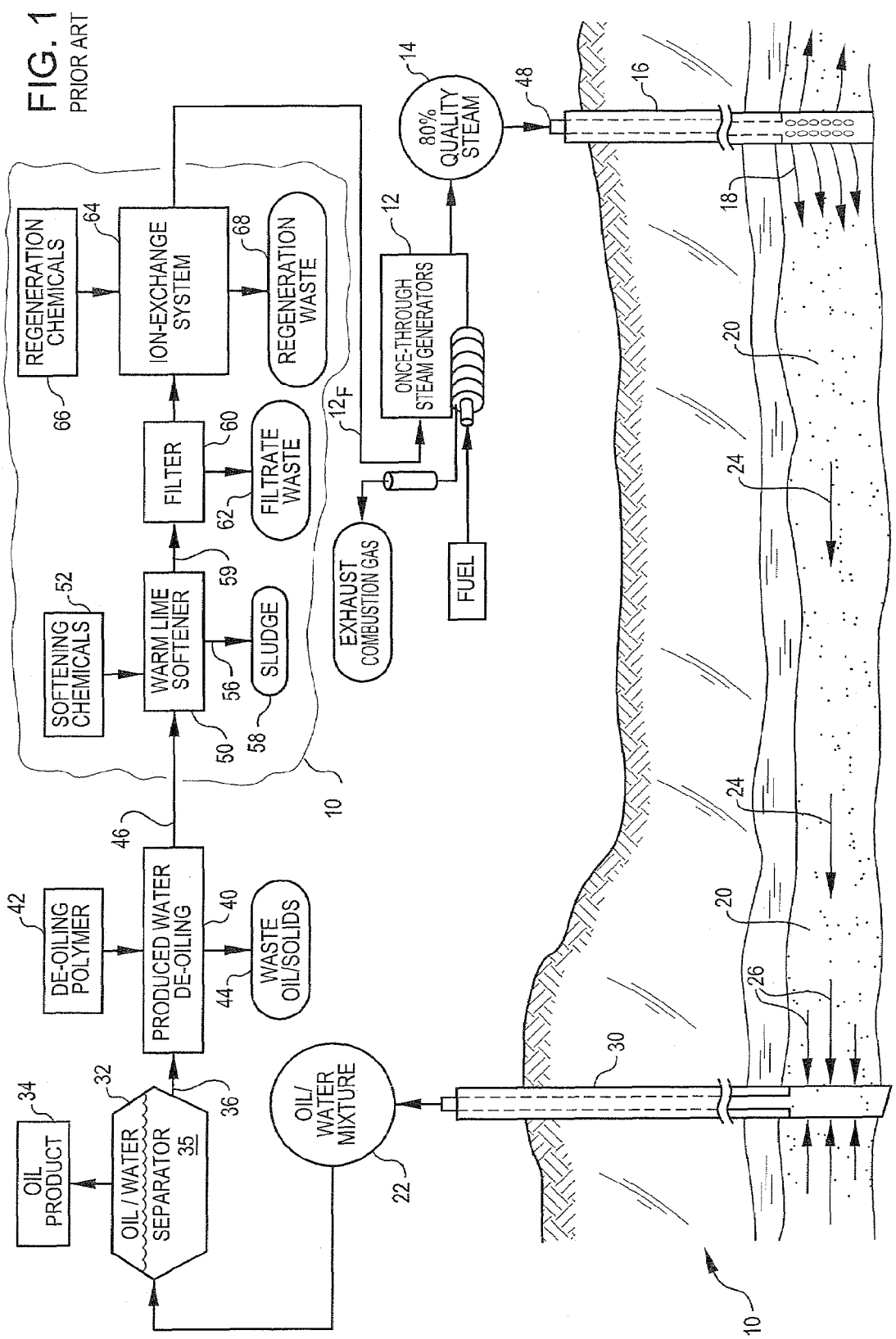
FIG. 1 shows one typical prior art process, namely a generalized process flow diagram for a physical-chemical water treatment process configured for use in heavy oil recovery operations.
Figure 2:
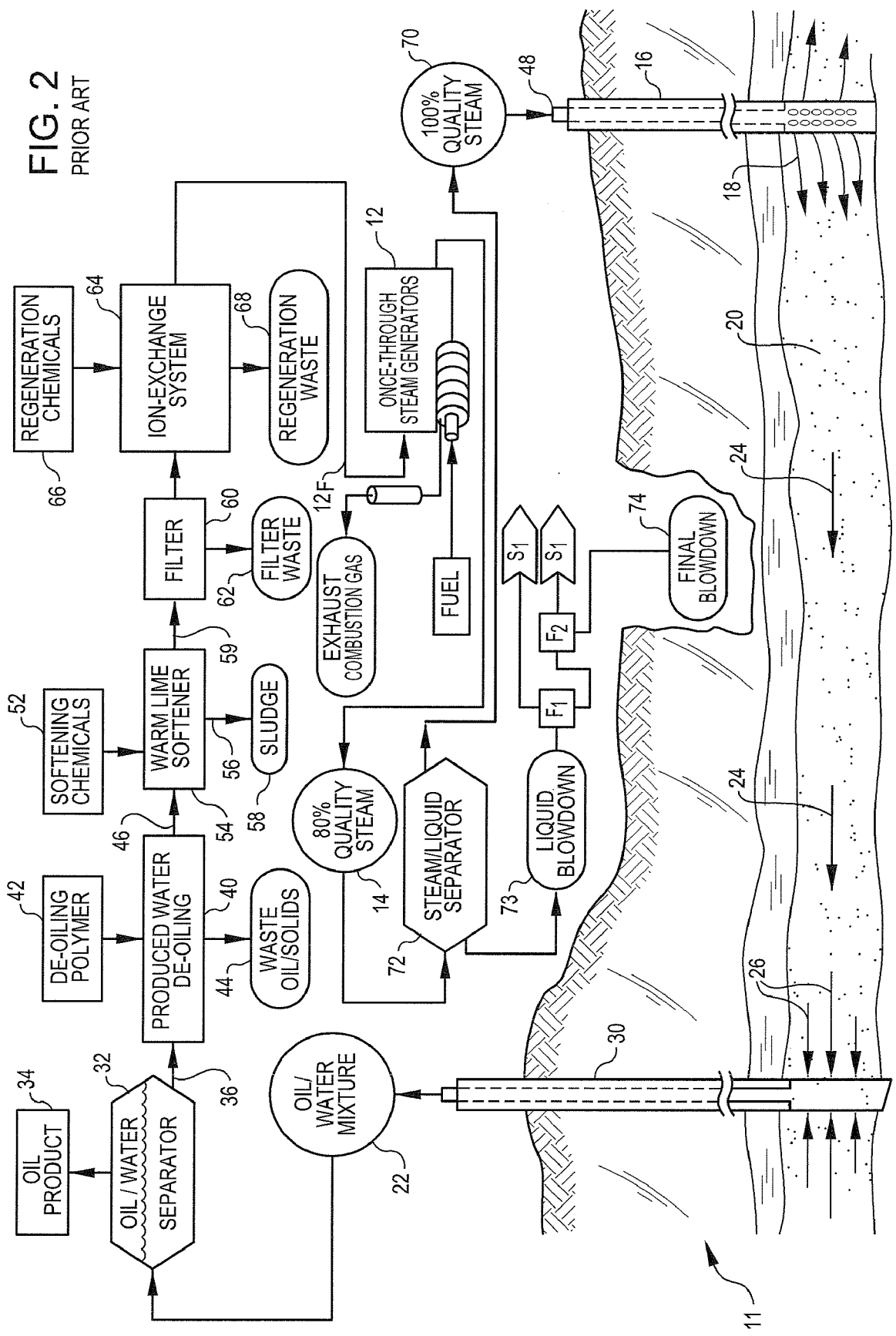
FIG. 2 shows another prior art process, namely a generalized process flow diagram for a physical-chemical water treatment process as used in a steam assisted gravity drainage (SAGD) type heavy oil operation.
Figure 3:
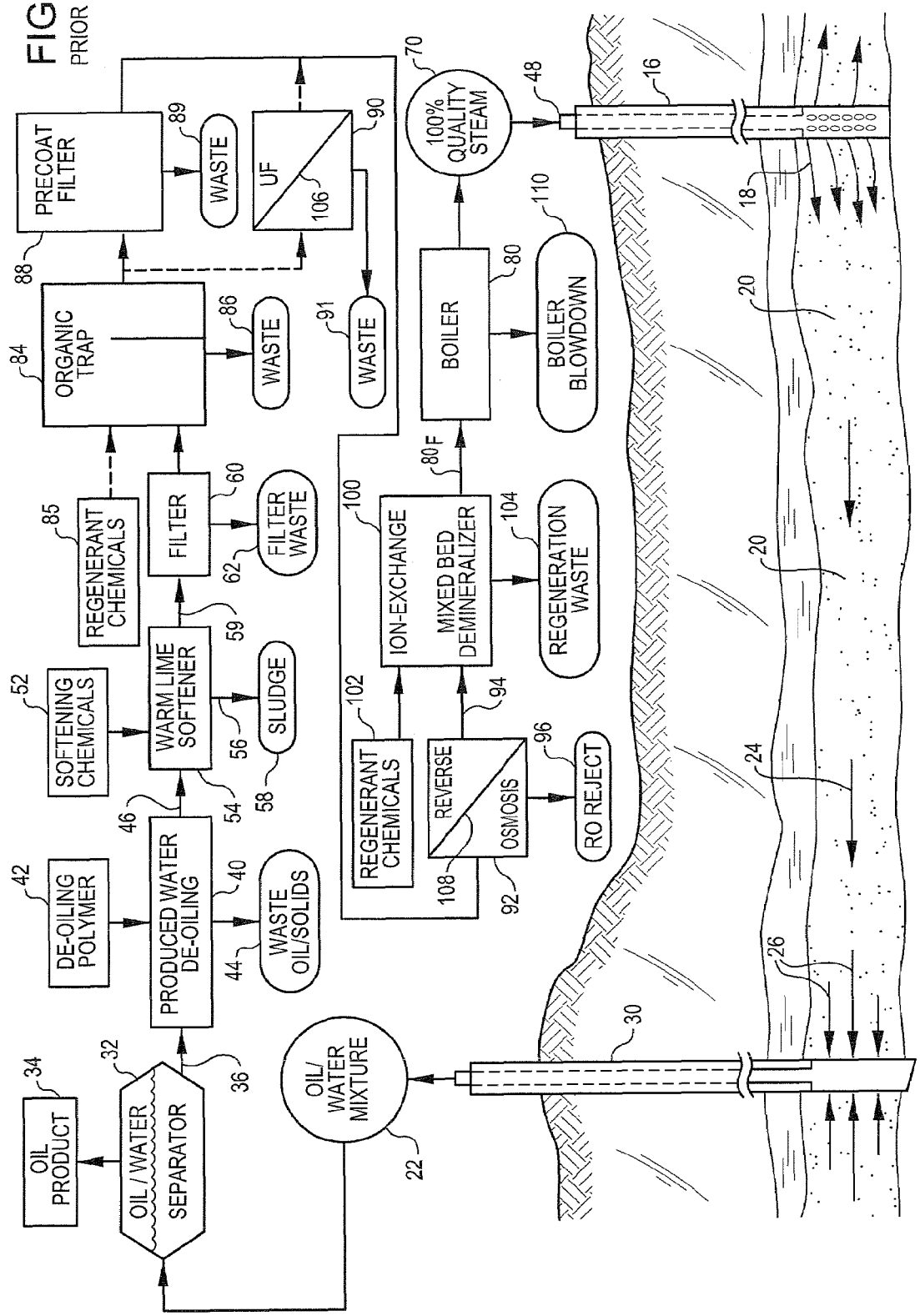
FIG. 3 shows yet another prior art physical-chemical treatment process scheme, also as it might be applied for use in steam assisted gravity drainage (SAGD) type heavy oil recovery operations.

In the process disclosed herein, the evaporator 140 is designed to produce high quality distillate (typically 2-5 ppm non-volatile TDS) which, after temperature adjustment to acceptable levels in heat exchangers 200 or 200' (typically by cooling to about 45° C., or lower) can be fed directly into polishing equipment (EDI system 220, ion exchange system 202, or reverse osmosis system 224) for final removal of dissolved solids. The water product produced by the polish equipment just mentioned is most advantageously used as feedwater for the packaged boiler 80. That is because in the typical once-though steam generator 12 used in oil field operations, it is normally unnecessary to incur the additional expense of final polishing by removal of residual total dissolved solids from the evaporator distillate stream 180. In some applications, final polishing is not necessary when using conventional boilers 80. This can be further understood by reference to FIG. 6, where a typical boiler feed water chemistry specification is presented for (a) packaged boilers, and (b) once-through steam generators. It may be appropriate in some embodiments from a heat balance standpoint that the de-oiled produced waters 46 fed to the evaporator for treatment be heated by heat exchange with the distillate stream 180. However, if the distillate stream is sent directly to once-through steam generators 12, then no cooling of the distillate stream 180 may be appropriate. Also, in the case of once-through steam generators 12, it may be necessary or appropriate to utilize a plurality of flash tanks, $F_1$ etc., in the manner described above with reference to FIG. 2.

Also, as briefly noted above, but significantly bears repeating, in those cases where the EDI system 220 is utilized for polishing, the membrane reject stream includes an EDI reject stream 222 that is recycled to be mixed with the de-oiled produced water 46 in the evaporator feed tank 210 system, for reprocessing through the evaporator 140. Similarly, when reverse osmosis is utilized the a membrane reject stream includes the RO reject stream which is recycled to be mixed with the de-oiled produced water 46 in the evaporator feed tank 210 system, for reprocessing through the evaporator 140. Likewise, when ion-exchange system 202 is utilized, the regenerant waste stream 206 is recycled to be mixed with the de-oiled produced water 46 in the evaporator feed tank system, for reprocessing through the evaporator 140.

Again, it should be emphasized that the blowdown 230 from the evaporator 140 is often suitable for disposal by deep well 240 injection. Alternately, the blowdown stream can be further concentrated and/or crystallized using a crystallizing evaporator, or a crystallizer, in order to provide a zero liquid discharge 242 type operation. This is an important advantage, since zero liquid discharge operations may be required if the geological formation is too tight to allow water disposal by deep well injection, or if regulatory requirements do not permit deep well injection.

Figure 11:
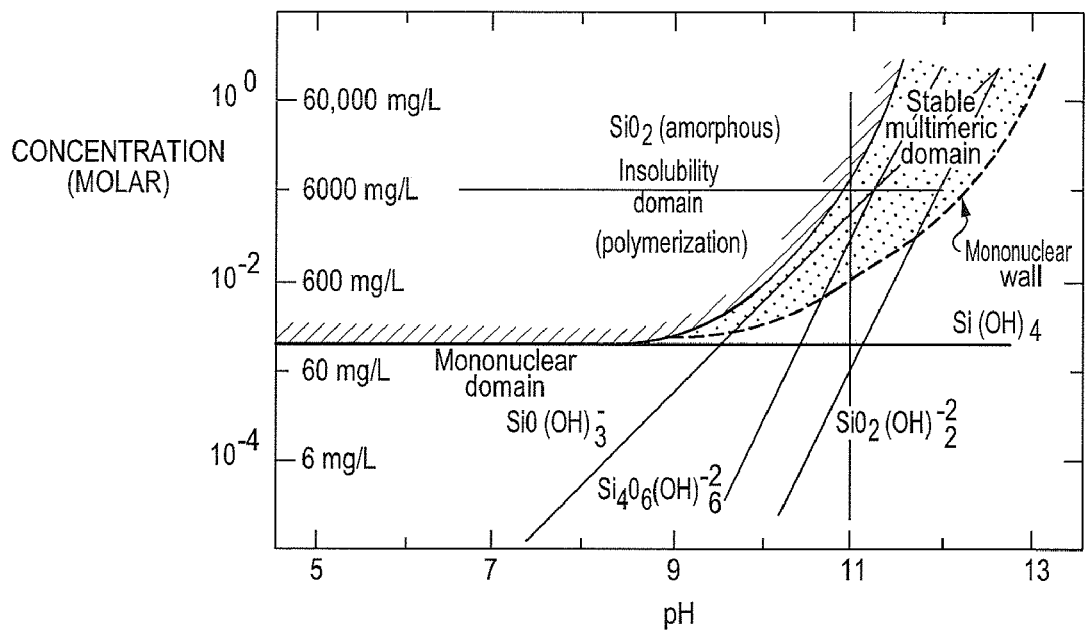
FIG. 11 illustrates the solubility of silica in water as a function of pH at 25° C. when such silica species are in equilibrium with amorphous silica, as well as the nature of such soluble silica species (molecule or ion) at various concentration and pH ranges.

Since many produced waters encountered in heavy oil production are high in silica, with typical values ranging up to about 200 mg/l as $SiO_2$, or higher. In order to minimize the capital cost of an evaporator, and particularly a mechanical vapor recompression (MVR) evaporation system 140, and while simultaneously providing a process design which prevents the scaling of the inner surfaces 260 of the heat transfer tubes 156 with the ever-present silica, operation of the evaporator 140 at high pH, i.e., in preferably excess of about 10.5 is undertaken. More preferably, operation in the range from about 11 to about 12, or even a higher pH in appropriate cases, can be used to keep the silica in aqueous solution. This is important, since silica solubility must be accounted for in the design and operation of the evaporator 140, in order to prevent silica scaling of the heat transfer surfaces 260. The solubility characteristics of silica are shown in FIG. 11. Since the high pH operation assures increased silica solubility, a concentration factor (i.e, ratio of rate of feed 151 to rate of blowdown 230) for the evaporator 140 can be selected so that silica solubility is not exceeded. Operation at high pH also allows the use of low cost heat transfer tubes 156 and other brine wetted surfaces such as sump walls 270 of sump 141, thus minimizing the capital cost of the system.

Since the calcium hardness and sulfate concentrations of many produced waters is low (typically 20-50 ppm Ca as CaCO3), it is possible in many cases to operate the evaporators 140 with economically efficient concentration factors, while remaining below the solubility limit of calcium sulfate, assuming proper attention to feedwater quality and to pretreatment processes.

It is to be appreciated that the water treatment process described herein for preparing boiler feedwater in heavy oil recovery operations is an appreciable improvement in the state of the art of water treatment for oil recovery operations. The process eliminates numerous of the heretofore encountered waste streams, while processing water in reliable mechanical evaporators, and in one embodiment, in mechanical vapor recompression ("MVR") evaporators. Polishing, if necessary, can be accomplished in ion exchange, electrodeionization, or reverse osmosis equipment. The process thus improves on currently used treatment methods by eliminating most treatment or regeneration chemicals, eliminating many waste streams, eliminating some types of equipment. Thus, the complexity associated with a high number of treatment steps involving different unit operations is avoided.

In the improved water treatment method, the control over waste streams is focused on a the evaporator blowdown, which can be conveniently treated by deep well 240 injection, or in a zero discharge system 242 such as a crystallizer and/or spray dryer, to reduce all remaining liquids to dryness and producing a dry solid 244. This contrasts sharply with the prior art processes, in which sludge from a lime softener is generated, and in which waste solids are gathered at a filter unit, and in which liquid wastes are generated at an ion exchange system and in the steam generators. Moreover, this waste water treatment process also reduces the chemical handling requirements associated with water treatment operations.

It should also be noted that the process described herein can be utilized with once through steam generators, since due to the relatively high quality feedwater—treated produced water—provided to such once through steam generators, the overall blowdown rate of as low as about 5% or less may be achievable in the once through steam generator. Alternately, as shown in FIG. 5, at least a portion of the liquid blowdown 134 from the once through steam generator 12 can be recycled to the steam generator 12, such as indicated by broken line 135 to feed stream 12F'.

In yet another embodiment, to further save capital and operating expense, industrial boilers of conventional design may be utilized since the distillate—treated produced water—may be of sufficiently good quality to be an acceptable feedwater to the boiler, even if it requires some polishing. It is important to observe that use of such boilers reduces the boiler feed system and evaporative produced water treatment system size by twenty percent (20%), eliminates vapor/liquid separation equipment as noted above, and reduces the boiler blowdown flow rate by about ninety percent (90%).

In short, evaporative treatment of produced waters using a falling film, vertical tube evaporator is technically and economically superior to prior art water treatment processes for heavy oil production. It is possible to recover ninety five percent (95%) or more, and even up to ninety eight percent (98%) or more, of the produced water as high quality distillate 180 for use as high quality boiler feedwater (resulting in only a 2% boiler blowdown stream which can be recycled to the feed for evaporator 140). Such a high quality distillate stream may be utilized in SAGD and non-SAGD heavy oil recovery operations. Such a high quality distillate stream may have less than 10 mg/L of non-volatile inorganic TDS and is useful for feed either to OTSGs or to conventional boilers.

The overall life cycle costs for the novel treatment process described herein are significantly less than for a traditional lime softening and ion exchange treatment system approach. And, an increase of about 2% to 3% in overall heavy oil recovery plant availability is achieved utilizing the treatment process described herein, which directly results in increased oil production from the facility. Since boiler blowdown is significantly reduced, by as much as 90% or more, the boiler feed system may be reduced in size by as much as fifteen percent (15%) or more. Finally, the reduced blowdown size results in a reduced crystallizer size when zero liquid discharge is achieved by treating blowdown streams to dryness.

Although only several exemplary embodiments of this invention have been described in detail, it will be readily apparent to those skilled in the art that the novel produced waste treatment process, and the apparatus for implementing the process, may be modified from the exact embodiments provided herein, without materially departing from the novel teachings and advantages provided by this invention, and may be embodied in other specific forms without departing from the spirit or essential characteristics thereof. Therefore, the disclosures presented herein are to be considered in all respects as illustrative and not restrictive. It will thus be seen that the objects set forth above, including those made apparent from the preceding description, are efficiently attained. Many other embodiments are also feasible to attain advantageous results utilizing the principles disclosed herein. Therefore, it will be understood that the foregoing description of representative embodiments of the invention have been presented only for purposes of illustration and for providing an understanding of the invention, and it is not intended to be exhaustive or restrictive, or to limit the invention only to the precise forms disclosed.

All of the features disclosed in this specification (including any accompanying claims, and the drawing) may be combined in any combination, except combinations where at least some of the features are mutually exclusive. Alternative features serving the same or similar purpose may replace each feature disclosed in this specification (including any accompanying claims, and the drawing), unless expressly stated otherwise. Thus, each feature disclosed is only one example of a generic series of equivalent or similar features. Further, while certain process steps are described for the purpose of enabling the reader to make and use certain water treatment processes shown, such suggestions shall not serve in any way to limit the claims to the exact variation disclosed, and it is to be understood that other variations, including various treatment additives or alkalinity removal techniques, may be utilized in the practice of my method.

The intention is to cover all modifications, equivalents, and alternatives falling within the scope and spirit of the invention, as expressed herein above and in any appended claims. The scope of the invention, as described herein and as indicated by any appended claims, is thus intended to include variations from the embodiments provided which are nevertheless described by the broad meaning and range properly afforded to the language of the claims, as explained by and in light of the terms included herein, or the legal equivalents thereof.

The invention claimed is:

1. A process for producing steam for downhole injection in the recovery of heavy oil, said process comprising:
    (a) providing an oil/water mixture gathered from an oil/water collection well;
    (b) separating oil from said oil/water mixture to provide an oil product and a produced water product containing oil therein;
    (c) de-oiling said oil containing produced water product to at least partially provide an evaporator feedwater stream, said evaporator feedwater stream comprising water, dissolved gases, and dissolved solutes, said dissolved solutes comprising silica;
    (d) providing an evaporator having a plurality of heat transfer elements, a liquid containing sump reservoir, and a recirculating pump to recycle a concentrated brine from said sump reservoir to said plurality of heat transfer elements;
    (e) injecting said evaporator feedwater stream into said evaporator and evaporating a portion of said feedwater stream to produce said concentrated brine;
    (f) recirculating said concentrated brine in said evaporator;
    (g) adding a selected base to said concentrated brine to maintain a preselected pH level to enhance solubility of said silica, by adding said selected base to one or more of (i) said evaporator feedwater stream, or (ii) said liquid containing sump reservoir, or (iii) said concentrated brine recirculated from said sump reservoir to said plurality of heat transfer elements;
    (h) distributing said concentrated brine on a first surface of at least one of said plurality of heat transfer elements to generate a steam vapor;
    (i) compressing said steam vapor to produce a compressed steam vapor;
    (j) directing said compressed steam vapor to a second surface of at least one of said plurality of heat transfer elements to condense said compressed steam vapor and to form a distillate;
    (k) collecting said distillate;
    (l) discharging at least some of said concentrated brine as an evaporator blowdown stream;
    (m) introducing said distillate into a steam generator, to produce
        (i) high pressure steam,
        (ii) a boiler blowdown stream, said boiler blowdown stream comprising water and residual dissolved solids;
    (n) injecting said high pressure steam in injection wells to fluidize oil present in a selected geological formation, to produce an oil and water mixture;
    (o) gathering said oil/water mixture.

2. The process as set forth in claim 1, wherein said distillate comprises residual solutes, further comprising removing residual solutes from said distillate to produce a substantially solute free distillate.

3. The process as set forth in claim 2, wherein said residual solutes in said distillate comprise non-volatile total organic carbon constituents.

4. The process as set forth in claim 2, wherein said residual solutes in said distillate comprise hardness.

5. The process as set forth in claim 2, further comprising cooling said distillate prior to removal of said residual solutes.

6. The process as set forth in claim 5, wherein said method further comprises heating said substantially solute free distillate before introducing said substantially solute free distillate into said steam generator.

7. The process as set forth in claim 2, wherein said residual solutes in said distillate are removed via ion exchange treatment.

8. The process as sec forth in claim 7, further comprising the step of regenerating said ion exchange resin to generate an ion exchange regenerant stream, and still further comprising returning said ion exchange regenerant stream to said evaporator feedwater stream prior to injecting said evaporator feedwater scream into said evaporator.

9. The process as set forth in claim 2, wherein said residual solutes are removed via membrane separation, wherein a solute containing membrane reject stream is produced.

10. The process as set forth in claim 9, wherein said membrane separation method comprises electrodeionization.

11. The process as set forth in claim 9, wherein said membrane separation method comprises reverse osmosis.

12. The process as set forth in claim 2, further comprising removing said residual solutes from said distillate in an electrodeionization treatment unit to produce (a) a substantially solute free boiler feedwater and (b) a solute containing electrodeionization reject stream.

13. The process as set forth in claim 12, further comprising, before injecting said evaporator feedwater stream into said evaporator, directing said electrodeionization reject stream to said evaporator feedwater stream.

14. The process as set forth in claim 1, wherein said process further comprises adding said boiler blowdown stream to said evaporator feedwater stream.

15. The process as set forth in claim 14, wherein, after adding said boiler blowdown stream, said evaporator feedwater stream is heated.

16. The process as set forth in claim 1, wherein said boiler blowdown stream is directly injected into said sump reservoir.

17. The process as set forth in claim 1, wherein said boiler blowdown stream is injected into said concentrated brine at a location upstream of said recirculation pump.

18. The process as set forth in claim 1, wherein said evaporator feedwater further comprises dissolved gases, and wherein said process further comprises heating said evaporator feedwater to remove at least some of said dissolved gases from said evaporator feedwater, prior to injection of said evaporator feedwater stream into said evaporator.

19. The process as set forth in claim 1, wherein rhea pH of the concentrated brine is maintained at a pH of at least 10.5.

20. The process as set forth in claim 19, wherein said evaporator further comprises a feed tank to receive said evaporator feedwater stream, and wherein the pH of the concentrated brine is maintained at a pH of at least 10.5 by adding said selected base to said evaporator feedwater stream in said feed tank.

21. The process as set forth in claim 19, wherein said evaporator further comprises a feed tank to receive said evaporator feedwater stream, and wherein the pH of the concentrated brine is maintained at a pH of at least 10.5 by adding said selected base to said evaporator feedwater stream at a point upstream of said feed tank.

22. The process as set forth in claim 1, wherein the pH of the concentrated brine is maintained at a pH of at least 10.5 by injection of said selected base into said concentrated brine.

23. The process as set forth in claim 1, wherein the pH of the concentrated brine is maintained at a pH of at least 10.5 by injection of said selected base to said sump reservoir.

24. The process as set forth in claim 1, wherein said selected base is injected into said concentrated brine to said recirculating pump.

25. The process as set forth in claim 1, wherein the pH of said concentrated brine is raised to a pH of at least 10.5 by (a) adding said selected base to said evaporator feedwater stream, and (b) adding said selected base to said sump reservoir.

26. The process as set forth in claim 1, wherein the pH of said concentrated brine circulating in said evaporator is maintained to at least 10.5.

27. The process as set forth in claim 1, wherein the pH of concentrated brine circulating in said evaporator is maintained to between about 11 and about 12.

28. The process as set forth in claim 1, wherein the pH of concentrated brine circulating in said evaporator is maintained to about 12 or above.

29. The process as set forth in claim 1, wherein said selected base comprises sodium hydroxide.

30. The process as set forth in claim 1, wherein said evaporator comprises a falling-film type evaporator.

31. The process as set forth in claim 30, wherein said heat transfer elements are tubular heat transfer elements having an interior surface and an exterior surface.

32. The process as set forth in claim 31, wherein said evaporator feedwater stream is concentrated at the interior surface of said tubular heat transfer elements.

33. The process as set forth in claim 30, wherein said evaporator comprises a mechanical vapor recompression evaporator.

34. The process as set forth in claim 1, wherein said evaporator comprises a forced-circulation type evaporator.

35. The process as set forth in claim 34, wherein said heat transfer elements are tubular heat transfer elements having an interior surface and an exterior surface. wherein said evaporator comprises a mechanical vapor recompression evaporator.

36. The process as set forth in claim 34, wherein said evaporator comprises a mechanical vapor recompression evaporator.

37. The process as set forth in claim 1, wherein said selected base is added into said evaporator feedwater stream and into said concentrated brine recirculated from said sump reservoir to said plurality of heat transfer elements.

38. The process as set forth in claim 1, further comprising treating said evaporator blowdown stream en a crystallizer.

39. The process as set forth in claim 1, further comprising treating said evaporator blowdown stream in a dryer.

40. The process as sec forth in claim 1, further comprising removing oil from said evaporator feedwater scream to a selected oil concentration before injecting said evaporator feedwater stream into said evaporator.

41. The process as set forth in claim 40, wherein the selected concentration of oil in said evaporator feedwater scream comprises less than about twenty parts per million.

42. The process as set forth in claim 1, wherein said steam generator comprises a packaged boiler.

43. The process as sec forth in claim 42, wherein said packaged boiler comprises a water tube boiler.

44. The process as set forth in claim 1, wherein said steam generator comprises a once-through steam generator, said once-through steam generator producing said high pressure steam stream and said boiler blowdown stream.

45. The process as set forth in claim 44, further comprising separating said high pressure steam stream and said boiler blowdown stream to produce a high pressure steam stream having substantially 100% steam quality.

46. The process as set forth in claim 45, wherein said substantially 100% steam quality steam is injected in said injection wells.

47. The process as set forth in claim 45, wherein said boiler blowdown stream is flashed at least once to produce a still further concentrated boiler blowdown stream comprising water and residual dissolved solutes.

48. The process as set forth in claim 47, further comprising the step of adding said residual liquid stream containing dissolved solutes to said evaporator feedwater stream.

49. A process for producing steam for downhole injection in the recovery of heavy oil, said process comprising:
  (a) providing an oil/water mixture gathered from an oil/water collection well;
  (b) separating oil from said oil/water mixture to provide an oil product and a produced water product containing oil therein;
  (c) pretreating said produced water product, pretreating comprising de-oiling said oil containing produced water product to at least partially provide a feedwater stream, said feedwater stream comprising water, dissolved gases, and dissolved solutes, said dissolved solutes comprising silica;

(d) providing an evaporator having a plurality of heat transfer elements, a liquid containing sump reservoir, and a recirculating pump to recycle a concentrated brine from said sump reservoir to said plurality of heat transfer elements;

(e) recirculating said concentrated brine;

(f) adding said feedwater to said concentrated brine before directing said concentrated brine to which said feedwater has been added to said plurality of heat transfer elements;

(g) maintaining a preselected high pH level in said concentrated brine to enhance solubility of said silica, by adding hydroxide ions to one or more of (i) said evaporator feedwater stream, or (ii) said liquid containing sump reservoir, or (iii) said concentrated brine recirculated from said sump reservoir to said pluralilty of heat transfer elements;

(h) distributing said concentrated brine on a first surface of at least one of said plurality of heat transfer elements to generate a steam vapor;

(i) compressing said steam vapor to produce a compressed steam vapor;

(j) directing said compressed steam vapor to a second surface of at least one of said plurality of heat transfer elements to condense said compressed steam vapor and to form a distillate;

(k) collecting said distillate;

(l) discharging at least some of said concentrated brine as an evaporator blowdown stream;

(m) introducing said distillate into a steam generator, to produce
  (i) high pressure steam, and
  (ii) a boiler blowdown stream, said boiler blowdown stream comprising water and residual dissolved solids;

(n) injecting said high pressure steam in injection wells to fluidize oil present in a selected geological formation, to produce an oil and water mixture;

(o) gathering said oil/water mixture.

50. The process as set forth in claim 49, wherein said distillate comprises residual solutes, further comprising removing residual solutes from said distillate to produce a substantially solute free distillate.

51. The process as set forth in claim 50, further comprising cooling said distillate prior to removal of said residual solutes.

52. The process as set forth in claim 51, wherein said method further comprises heating said substantially solute free distillate before introducing said substantially solute free distillate into said steam generator.

53. The process as set forth in claim 49, wherein said process further comprises adding said boiler blowdown stream to said feedwater stream.

54. The process as set forth in claim 53, wherein, after adding said boiler blowdown stream, said evaporator feedwater stream is heated.

55. The process as set forth in claim 49, wherein said boiler blowdown stream is directly injected into said sump reservoir.

56. The process as set forth in claim 49, wherein said boiler blowdown stream is injected into said concentrated brine at a location upstream of said recirculation pump.

57. The process as set forth in claim 49, wherein the pH of the concentrated brine is maintained at a pH of at least 10.5.

58. The process as set forth in claim 57, wherein said evaporator further comprises a feed tank to receive said evaporator feedwater stream, and wherein the pH of the concentrated brine is maintained at a pH of at least 10.5 by adding hydroxide ions to said evaporator feedwater stream in said feed tank.

59. The process as set forth in claim 57, wherein said evaporator further comprises a feed tank to receive said evaporator feedwater stream, and wherein the pH of the concentrated brine is maintained at a pH of at least 10.5 by adding hydroxide ions to said evaporator feedwater stream at a point upstream of said feed tank.

60. The process as set forth in claim 49, wherein the pH of the concentrated brine is maintained at a pH of at least 10.5 by injection of hydroxide ions to said concentrated brine.

61. The process as set forth in claim 49, wherein the pH of the concentrated brine is maintained at a pH of at least 10.5 by injection of said hydroxide ions to said sump reservoir.

62. The process as set forth in claim 49, wherein said hydroxide ions are injected into said concentrated brine to said recirculating pump.

63. The process as set forth in claim 49, wherein the pH of said concentrated brine is raised to a pH of at least 10.5 by (a) adding said hydroxide ions to said evaporator feedwater stream, and (b) adding said hydroxide ions to said sump reservoir.

64. The process as set forth in claim 49, wherein the pH of said concentrated brine circulating in said evaporator is maintained to at least 10.5.

65. The process as set forth in claim 49, wherein the pH of concentrated brine circulating in said evaporator is maintained to between about 11 and about 12.

66. The process as set forth in claim 49, wherein the pH of concentrated brine circulating in said evaporator is maintained to about 12 or above.

67. The process as set forth in claim 49, wherein said evaporator comprises a falling-film type evaporator.

68. The process as set forth in claim 49, wherein said evaporator comprises a forced-circulation type evaporator.

69. The process as set forth in claim 49, wherein said hydroxide ions are added into said evaporator feedwater stream and into said concentrated brine recirculated from said sump reservoir to said plurality of heat transfer elements.

70. The process as set forth in claim 49, further comprising the step of treating said evaporator blowdown stream in a crystallizer.

71. The process as set forth in claim 49, further comprising the step of treating said evaporator blowdown stream in a dryer.

72. The process as set forth in claim 49, wherein said steam generator comprises a packaged boiler.

73. The process as set forth in claim 49, wherein said steam generator comprises a once-through steam generator, said once-through steam generator producing said high pressure steam stream and said boiler blowdown stream.

74. The process as set forth in claim 73, further comprising separating said high pressure steam stream and said boiler blowdown stream to produce a high pressure steam stream having substantially 100% steam quality.

* * * * *

UNITED STATES PATENT AND TRADEMARK OFFICE
CERTIFICATE OF CORRECTION

PATENT NO. : 7,428,926 B2
APPLICATION NO. : 11/149070
DATED : September 30, 2008
INVENTOR(S) : William F. Heins It is certified that error appears in the above-identified patent and that said Letters Patent is hereby corrected as shown below:

IN THE SPECIFICATION:
Column 1, Line 52, delete "("OTSG's).As" and substitute therefore --("OTSG's"). As--.

Column 8, line 9, after the words "via line", delete "147can" and substitute therefore --147 can--.

Column 10, line 51, after the words "200 or", delete "(200'(typically" and substitute therefore --200' (typically--.

IN THE CLAIMS:
Column 14, line 58, delete "scream", and insert therefore
--stream--.

Column 16, line 11, after the words "and an exterior surface", delete ", wherein said evaporator comprises a mechanical vapor recompression evaporator".

Signed and Sealed this

Ninth Day of February, 2010

David J. Kappos
*Director of the United States Patent and Trademark Office*